(12) United States Patent
Choi et al.

(10) Patent No.: US 7,637,641 B2
(45) Date of Patent: Dec. 29, 2009

(54) BACKLIGHT ASSEMBLY AND LIQUID CRYSTAL DISPLAY DEVICE HAVING THE SAME

(75) Inventors: Seong-Sik Choi, Seoul (KR); Dong-Lyoul Shin, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 165 days.

(21) Appl. No.: 11/347,682

(22) Filed: Feb. 3, 2006

(65) Prior Publication Data

US 2006/0176420 A1 Aug. 10, 2006

(30) Foreign Application Priority Data

Feb. 4, 2005 (KR) ........................ 10-2005-0010677

(51) Int. Cl.
*F21V 7/00* (2006.01)
(52) U.S. Cl. .................. 362/346; 362/29; 362/224; 362/330
(58) Field of Classification Search .................... 362/97, 362/219, 221–225, 260, 330, 346, 561, 623, 362/630, 632, 29; 349/65
See application file for complete search history.

(56) References Cited

U.S. PATENT DOCUMENTS

| | | | | | |
|---|---|---|---|---|---|
| 3,965,345 | A | * | 6/1976 | Fordsmand | 362/218 |
| 5,504,545 | A | * | 4/1996 | Hagihara et al. | 353/74 |
| 6,491,411 | B2 | * | 12/2002 | Itoh | 362/246 |
| 6,783,256 | B2 | * | 8/2004 | Moon | 362/241 |
| 6,939,020 | B2 | * | 9/2005 | Lim | 362/97 |
| 6,979,102 | B2 | * | 12/2005 | You | 362/218 |
| 7,070,313 | B2 | * | 7/2006 | Kim et al. | 362/561 |
| 7,172,330 | B2 | * | 2/2007 | Lee et al. | 362/634 |
| 7,229,193 | B2 | * | 6/2007 | Jeon | 362/225 |
| 2005/0265047 | A1 | * | 12/2005 | Yun et al. | 362/611 |
| 2006/0098454 | A1 | * | 5/2006 | Tseng et al. | 362/614 |
| 2006/0176420 | A1 | * | 8/2006 | Choi et al. | 349/62 |
| 2006/0203480 | A1 | * | 9/2006 | Choi | 362/225 |
| 2007/0081322 | A1 | * | 4/2007 | Choi et al. | 362/97 |

FOREIGN PATENT DOCUMENTS

| | | |
|---|---|---|
| CN | 1467550 A | 1/2004 |
| CN | 1549029 A | 11/2004 |
| JP | 2003-346541 A | 12/2003 |
| KR | 1020030094691 A | 12/2003 |
| KR | 1020050011949 A | 1/2005 |

* cited by examiner

*Primary Examiner*—Gunyoung T Lee
(74) *Attorney, Agent, or Firm*—Cantor Colburn LLP

(57) ABSTRACT

In a backlight assembly and a display device having the same, the backlight assembly includes a receiving container, a light source, a reflecting member and an optical member. The receiving container includes a bottom plate and a sidewall protruded from a side of the bottom plate. The light source is received in the receiving container. The light source generates light. The reflecting member is interposed between the bottom plate and the light source. The reflecting member has a protruded portion protruded upward to support the light source. The optical member is on the light source to improve optical characteristics of the light generated from the light source.

26 Claims, 7 Drawing Sheets

BACKLIGHT ASSEMBLY AND LIQUID CRYSTAL DISPLAY DEVICE HAVING THE SAME

The present application claims priority to Korean Patent Application No. 2005-10677, filed on Feb. 4, 2005, and all the benefits accruing therefrom under 35 U.S.C. §119, the contents of which are herein incorporated by reference in its entirety.

BACKGROUND OF THE INVENTION

1. Field of the Invention

The present invention relates to a backlight assembly and a liquid crystal display (LCD) device having the backlight assembly. More particularly, the present invention relates to a backlight assembly capable of improving an impact resistance and decreasing a manufacturing cost and an LCD device having the backlight assembly.

2. Description of the Related Art

An LCD device that may be used in flat panel display devices displays images using a liquid crystal that has electrical and optical characteristics. The LCD device has various characteristics such as thin thickness, low driving voltage, low power consumption, etc. The LCD device is widely available in various fields.

The LCD device is a non-emissive type display device that requires a backlight assembly that generates a light. The backlight assembly includes a receiving container, a light source and an optical member. The receiving container forms a receiving space. The light source is received in the receiving space to generate a light. The optical member is on the light source to improve optical characteristics of the light generated from the light source.

When a size of the LCD device is increased, a size of the light source that is a lamp is also increased. When the size of the lamp is increased, the lamp is vulnerable to an impact provided from outside of the LCD device such that the lamp may become bent or separated from a predetermined fixed position.

In addition, when the size of the LCD device is increased, a manufacturing cost of the LCD device is also increased.

SUMMARY OF THE INVENTION

An illustrated exemplary embodiment provides a backlight assembly capable of improving an impact resistance and decreasing a manufacturing cost.

Another illustrated embodiment provides a liquid crystal display (LCD) device having the above-mentioned backlight assembly.

An exemplary embodiment of a backlight assembly includes a receiving container, a light source, a reflecting member and an optical member. The receiving container includes a bottom plate and a sidewall protruded from a side of the bottom plate. The light source is received in the receiving container. The light source generates a light. The reflecting member is interposed between the bottom plate and the light source. The reflecting member has a protruded portion protruded upward to support the light source. The optical member is on the light source to improve optical characteristics of the light generated from the light source.

An exemplary embodiment of a display device includes a backlight assembly, a display panel and a fixing member. The backlight assembly includes a receiving container, a light source, a reflecting member and an optical member. The receiving container includes a bottom plate and a sidewall protruded from a side of the bottom plate. The light source is received in the receiving container. The light source generates a light. The reflecting member is interposed between the bottom plate and the light source. The reflecting member has a protruded portion protruded upward to support the light source. The optical member is on the light source to improve optical characteristics of the light generated from the light source. The display panel is on the backlight assembly to display an image using the light from the backlight assembly. The fixing member fixes the display panel to the backlight assembly.

Another exemplary embodiment of a display device includes a backlight assembly, a display panel and a receiving member. The backlight assembly includes a receiving container, a lamp, a reflecting member and an optical member. The lamp is received in the receiving container. The reflecting member is received in the receiving container. The reflecting member has a protruded portion protruded upward and configured to support the lamp. The optical member is on the lamp. The display panel is on the backlight assembly and configured to display an image. The receiving member is configured to receive the backlight assembly and the display panel.

In another exemplary embodiment, the reflecting member supports the optical member to absorb an externally provided impact.

BRIEF DESCRIPTION OF THE DRAWINGS

The above and other advantages of the illustrated embodiments will become more apparent by describing in detail exemplary embodiments thereof with reference to the accompanying drawings, in which.

DETAILED DESCRIPTION OF THE INVENTION

Figure 1:
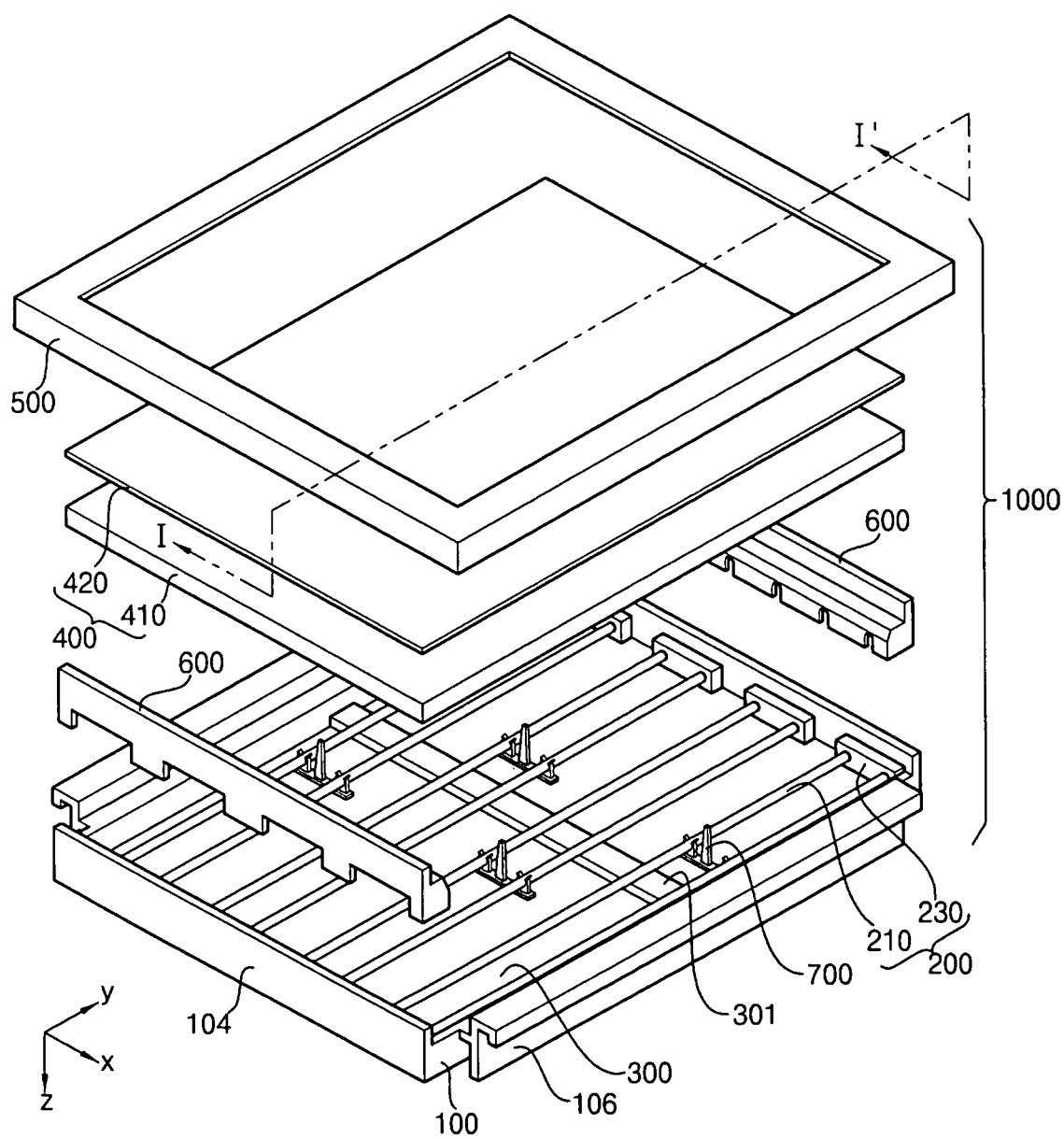
FIG. 1 is an exploded perspective view showing an exemplary embodiment of a backlight assembly in accordance with the invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present. In contrast, when an element is referred to as being "directly on" another element, there are no intervening elements present. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first thin film could be termed a second thin film, and, similarly, a second thin film could be termed a first thin film without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 2:
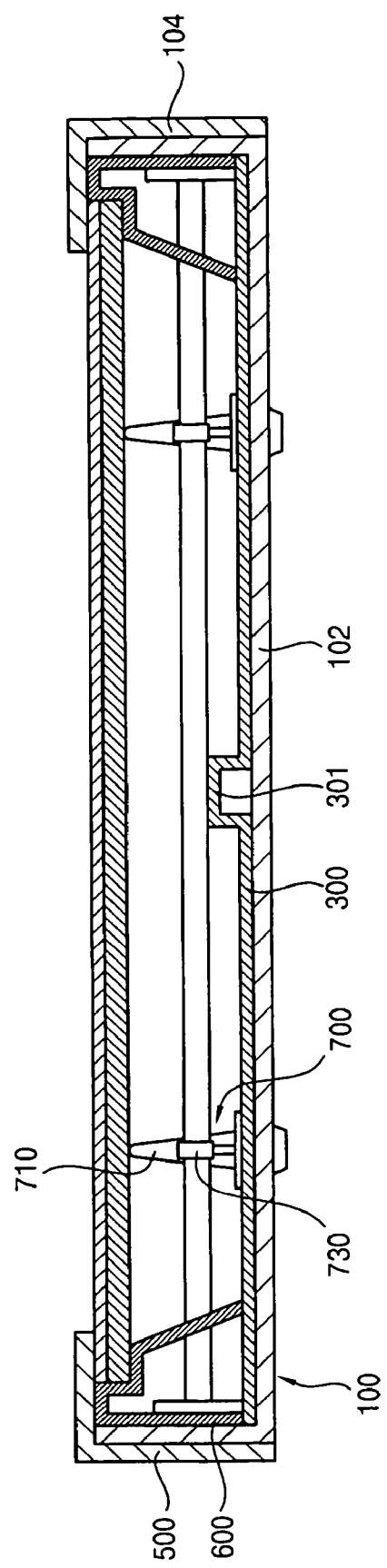
FIG. 2 is a cross-sectional view taken along line I-I' shown in FIG. 1.
Figure 3:
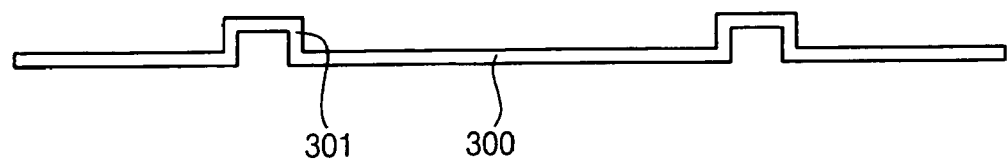
FIG. 3 is a cross-sectional view showing an exemplary embodiment of a reflecting member shown in FIG. 2.

FIG. 1 is an exploded perspective view showing an exemplary embodiment of a backlight assembly in accordance with the invention. FIG. 2 is a cross-sectional view taken along line I-I' shown in FIG. 1. FIG. 3 is a cross-sectional view showing an exemplary embodiment of a reflecting member shown in FIG. 2.

Referring to FIGS. 1 to 3, the backlight assembly 1000 includes a receiving container 100, a light source 200, a reflecting member 300, an optical member 400 and a mold frame 500.

The receiving container 100 includes a bottom plate 102 and a plurality of sidewalls 104 protruded from sides of the bottom plate 102 to form a receiving space. In the backlight assembly 1000 in FIGS. 1 to 3, the bottom plate 102 has a quadrangular plate shape. One of the sidewalls 104 has a bending portion 106 that supports a peripheral portion of the optical member 400, and guides the optical member 400. In the backlight assembly 1000 in FIGS. 1 to 3, two bending portions 106 are substantially in parallel with a longitudinal direction of the lamp 210. In alternative exemplary embodiments, the sidewalls 104 have four bending portions 106, respectively. In the backlight assembly 1000 in FIGS. 1 to 3, the receiving container 100 may include a strong metal that is resistant to a deformation.

The light source 200 is received in the receiving container 100 to generate a light. In the backlight assembly 1000 in FIGS. 1 to 3, the light source 200 includes a plurality of lamps 210 that are substantially in parallel with one another. In exemplary embodiments, each of the lamps 210 may be a cold cathode fluorescent lamp (CCFL) that has a cylindrical shape. In alternative embodiments, the CCFL may have an U-shape. In other exemplary embodiments, each of the lamps 210 may be an external electrode fluorescent lamp (EEFL).

The lamps 210 as illustrated in FIG. 1 are spaced apart from one another by a constant distance. The lamps 210 being spaced apart at various distances is also contemplated. The number of the lamps 210 is determined by a luminance of the backlight assembly 1000 and may include any of a number of lamps 210 suitable for the purposes described herein.

The backlight assembly 1000 includes a lamp holder 230 and an inverter (not shown). The lamp holder 230 fixes the lamps 210 to the receiving container 100. The inverter (not shown) applies a driving voltage to the lamps 210. The lamp holder 230 is disposed at end portions of the lamps 210 and configured to cover the end portions of the lamps 210. In exemplary embodiments, the light may not be generated from the end portions of the lamps 210. The lamp holder 230 may be combined with the receiving container 100 to fix the lamps 210 to the receiving container 100. In the receiving container 100 in FIGS. 1 to 3, two lamps 210 are combined with one lamp holder 230. In alternative embodiments, a plurality of lamps 210 may be combined with one lamp holder 230.

The light generated from the lamps 210 is reflected from the reflecting member 300 toward a viewer's side of the backlight assembly 1000. In the backlight assembly 1000 in FIGS. 1 to 3, the reflecting member 300 includes a microcellular high-reflection foamed sheet (MCPET).

The reflecting member 300 includes a protruded portion 301. The protruded portion 301 is protruded upward from the bottom plate 102 and makes contact with the lamps 210. That is, the protruded portion 301 is protruded from a lower surface of the reflecting member 300 toward the lamps 210. The protruded portion 301 is extended in a direction that crosses a longitudinal direction of the lamps 210. In the backlight assembly 1000 in FIGS. 1 to 3, the longitudinal direction of the protruded portion 301 is substantially perpendicular to the longitudinal direction of the lamps 210. In the backlight assembly 1000 in FIGS. 1 to 3, the protruded portion 301 directly makes contact with the lamps 210. In alternative embodiments, the protruded portion 301 may make contact with the lamps 210 through an auxiliary cushioning member (not shown). The protruded portion 301 absorbs an impact that may be provided from outside of the backlight assembly 1000 to protect the lamps 210. In particular, the protruded portion 301 absorbs an impact in a vertical direction of the backlight assembly 1000. In addition, the protruded portion 301 supports central portions of the lamps 210 to prevent sagging of the lamps 210, advantageously allowing a length of each of the lamps 210 to be increased.

In the backlight assembly 1000 in FIGS. 1 to 3, the protruded portion 301 has a quadrangular cross-section. In alternative embodiments the protruded portion 301 may have a semi-circular shape, a triangular shape, or any of a number of shapes suitable for the purpose described herein. One protruding portion 301 is illustrated in FIGS. 1 and 2, but the reflecting member 300 may also include a plurality of protruded portions 301 as shown in FIG. 3.

The optical member 400 is disposed on the lamps 210. The optical member 400 improves optical characteristics of the light generated from the lamps 210. The optical member 400 includes a diffusion plate 410 and an optical sheet 420. The optical sheet 420 is on the diffusion plate 410. The diffusion plate 410 is on the lamps 210 to uniformize a luminance of the light that is generated from the lamps 210. The diffusion plate 410 has a substantially flat plate shape. In the backlight assembly 1000 in FIGS. 1 to 3, the diffusion plate 410 may include polymethyl-methacrylate (PMMA) and a plurality of beads in the PMMA.

The optical sheet 420 increases a luminance of the light that passes through the diffusion plate 410 when viewed from a front of the backlight assembly 1000 and/or uniformizes the luminance of the light that passes through the diffusion plate 410. In the backlight assembly in FIGS. 1 to 3, the optical sheet 420 may include a brightness enhancement film (BEF) (not shown) and/or a diffusion sheet (not shown). The BEF increases the luminance of the light when viewed from the front of the backlight assembly 1000. The diffusion sheet diffuses the light that has passed through the diffusion plate 410. In exemplary embodiments, the backlight assembly 1000 may include various optical sheets.

The mold frame 500 is combined with the receiving container 100 to fix the optical member 400 to the receiving container 100. A display panel (not shown) may be on the mold frame 500 such that the mold frame 500 supports the display panel (not shown).

The backlight assembly 1000 further includes a guide member 600. The guide member 600 supports a peripheral portion of the optical member 400, and guides the optical member 400. In the backlight assembly 1000 in FIGS. 1 to 3, the guide member 600 covers the lamps 210, and has a plurality of recesses through which the end portions of the lamps 210 are inserted. In particular, the guide member 600 supports peripheral portions of the diffusion plate 410 and the optical sheet 420. The guide member 600 is substantially perpendicular to the longitudinal direction of the lamps 210, or the Y-direction. Two of the guide member 600 are shown in FIGS. 1 and 2, but any of a number of the guide member 600 may be included in the backlight assembly 1000 as is suitable for the purpose described herein.

In the backlight assembly 1000 in FIGS. 1 to 3, the guide member 600 may include a material having high reflectivity such that the light generated from the lamps 210 is diffused on a surface of the guide member 600. In exemplary embodiments, the guide member 600 includes a polycarbonate (PC). The guide member 600 may further include a protrusion (not shown) on an upper surface of the guide member 600 to prevent, or effectively reduce, a drifting of the optical member 400 in a horizontal direction of the backlight assembly 1000.

The backlight assembly 1000 further includes a lamp fixing member 700. The lamp fixing member 700 includes a supporting portion 710 and a holding portion 730. The supporting portion 710 supports the optical member 400 to prevent a sagging of the optical member 400 toward the lamps 210 in the Z-direction. The holding portion 730 holds the lamps 210 to prevent a drifting of the lamps 210 in a direction substantially perpendicular to the longitudinal direction of the lamps 210, or the X-direction. The supporting portion 710 includes a conical shape, and makes contact with the diffusion plate 410. Any of a number of shapes are contemplated that are suitable for the purpose described herein. The holding portion 730 holds the lamps 210 to prevent a movement of the lamps 210 in a vertical, or Z-direction, of the backlight assembly 1000. In the backlight assembly in FIGS. 1 to 3, each of the lamps 210 is pressed on the holding portion 730 so that each of the lamps 210 is inserted into the holding portion 730. The lamp fixing member 700 may be combined with the bottom plate 102.

As best illustrated in FIG. 1, one lamp fixing member 700 is used for each set of two lamps 210 and the lamp holder 230. More than one lamp fixing member may be used for the set of lamps 210 and a lamp fixing member 700 may hold any of a number of lamps 210.

The inverter is on the receiving container 100. In the backlight assembly 1000 in FIGS. 1 to 3, the inverter is on an outer surface of the receiving container 100. The inverter applies a driving voltage to the lamps 210. The inverter elevates a level of an externally provided voltage to generate the discharge voltage. The discharge voltage generated from the inverter is applied to the lamps 210 through a power supply line (not shown).

According to the backlight assembly 1000 in FIGS. 1 to 3, the reflecting member 300 includes the protruded portion 301 that is protruded upward to protect the lamps 210 from the externally provided impact. In addition, the protruded portion 301 prevents the sagging of the lamps 210.

Figure 4:
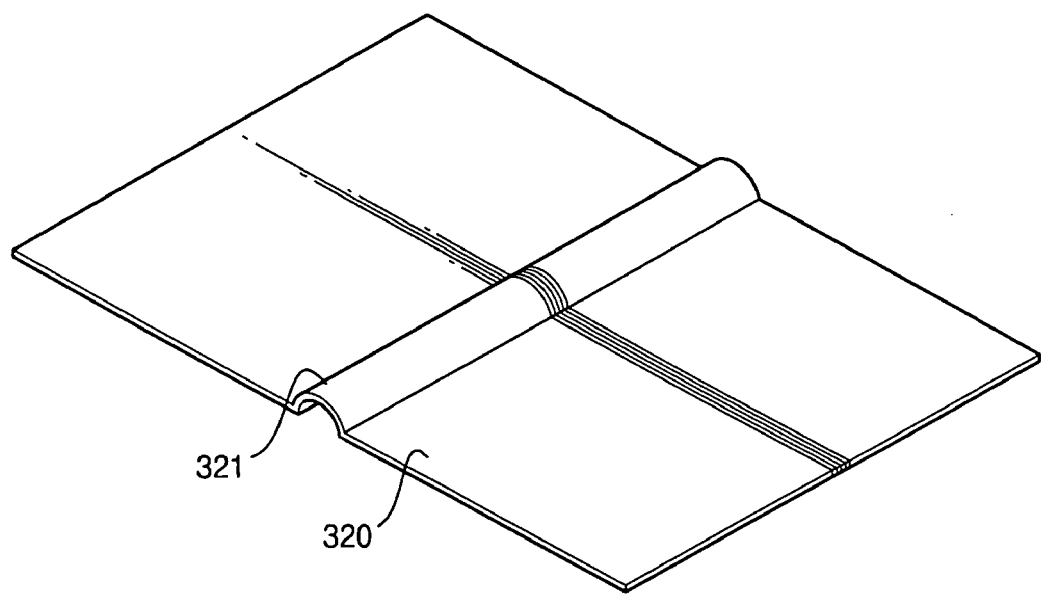
FIG. 4 is a perspective view showing another exemplary embodiment of a reflecting member in accordance with the invention.

FIG. 4 is a perspective view showing an exemplary embodiment of a reflecting member in accordance with the invention. A backlight assembly 1000 having the reflecting member of FIG. 4 is substantially similar as in FIGS. 1 to 3, except for the reflecting member. Thus, the same reference numerals will be used to refer to the same or like parts as those described in FIGS. 1 to 3 and further detailed explanation concerning the above elements will be omitted.

Referring to FIGS. 1 and 4, the reflecting member 320 is received in a receiving container 100 such that a light generated from lamps 210 is reflected from the reflecting member 320. In FIG. 4, the reflecting member 320 may include a micro-cellular high-reflection foamed sheet (MCPET). The reflecting member 320 includes a protruded portion 321. The protruded portion 321 is protruded upward from the reflecting member 320, and makes contact with the lamps 210. The protruded portion 321 is extended in a direction that crosses a longitudinal direction of the lamps 210. In FIG. 4, the longitudinal direction of the protruded portion 321 is substantially perpendicular to the longitudinal direction of the lamps 210. In FIG. 4, the protruded portion 321 has a semicircular cross-section, but any of a number of shapes and cross-sections are contemplated. In exemplary embodiments, the reflecting member 320 may also include a plurality of protruded portions 321.

According to the backlight assembly 1000 having the reflecting member 320 in FIG. 4, the protruded portion 321 has the semicircular shape to prevent, or effectively reduce, the lamps 210 from being scratched by a corner of the protruded portion 321.

Figure 5:
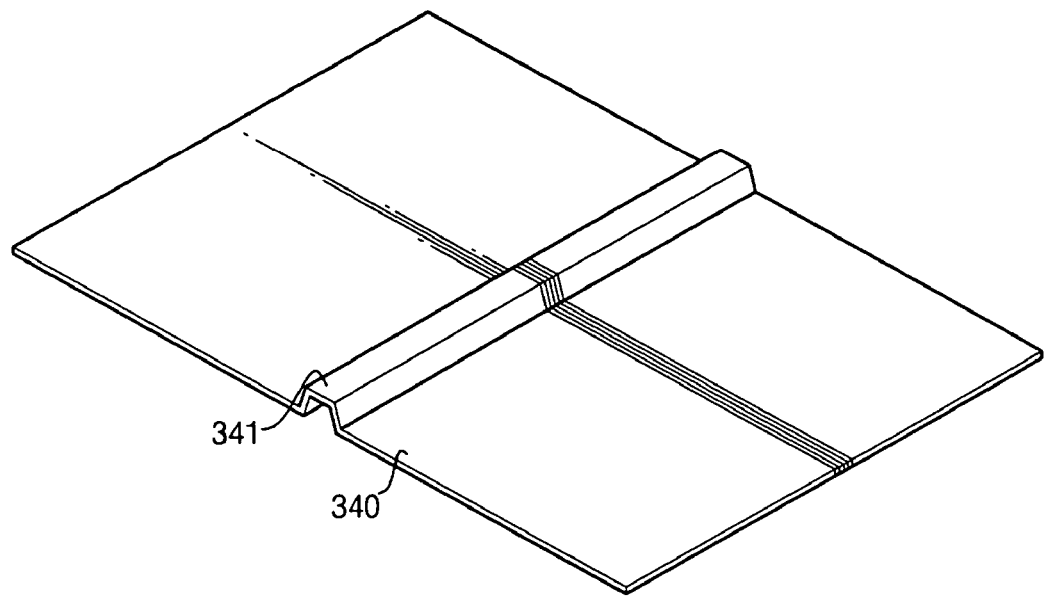
FIG. 5 is a perspective view showing another exemplary embodiment of a reflecting member in accordance with the invention.

FIG. 5 is a perspective view showing another exemplary embodiment of a reflecting member in accordance with the invention. A backlight assembly 1000 having the reflecting member of FIG. 5 is substantially similar as in FIGS. 1 to 3 except for the reflecting member. Thus, the same reference numerals will be used to refer to the same or like parts as those described in FIGS. 1 to 3 and further detailed explanation concerning the above elements will be omitted.

Referring to FIGS. 1 and 5, the reflecting member 340 is received in a receiving container 100 such that a light generated from lamps 210 is reflected from the reflecting member 340. The reflecting member 340 includes a protruded portion 341. The protruded portion 341 is protruded upward from the reflecting member 340, and makes contact with the lamps 210. The protruded portion 341 is extended in a direction that crosses a longitudinal direction of the lamps 210. In FIG. 5, the longitudinal direction of the protruded portion 341 is substantially perpendicular to the longitudinal direction of the lamps 210. The protruded portion 341 has a trapezoidal cross-section, but any of a number of shapes and cross-sections are contemplated.

According to the backlight assembly 1000 having the reflecting member 340 in FIG. 4, the protruded portion 341 has the trapezoidal shape to securely support the lamps 210. Advantageously, the light generated from the lamps 210 is effectively reflected from the reflecting member 340.

Figure 6:
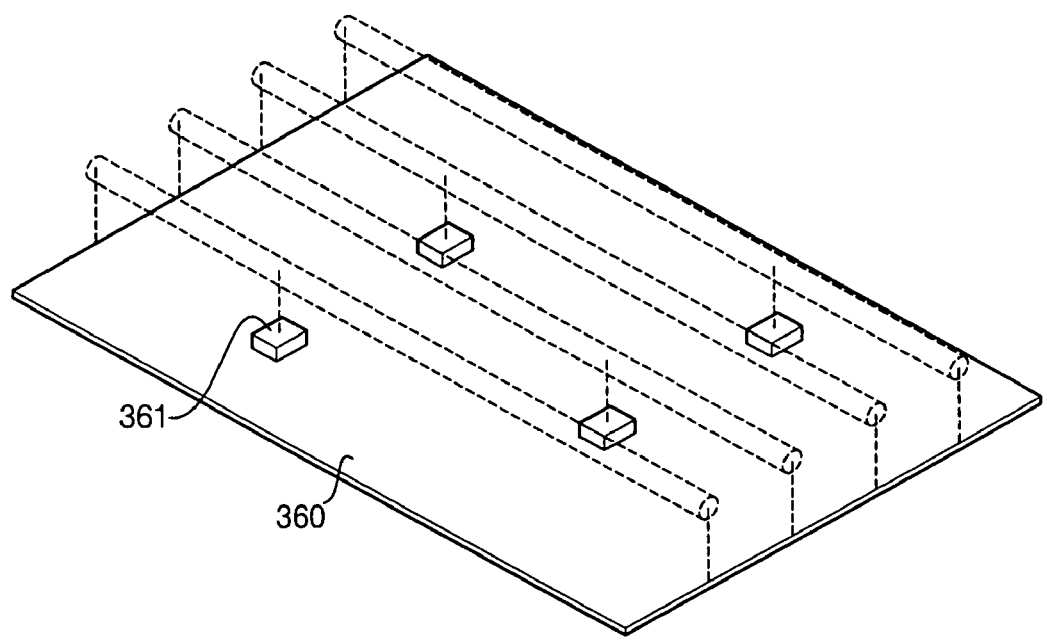
FIG. 6 is a perspective view showing another exemplary embodiment of a reflecting member in accordance with the invention.

FIG. 6 is a perspective view showing another exemplary embodiment of a reflecting member in accordance with the invention. A backlight assembly 1000 having the reflecting member of FIG. 6 is substantially similar as in FIGS. 1 to 3 except for the reflecting member. Thus, the same reference numerals will be used to refer to the same or like parts as those described in FIGS. 1 to 3 and further detailed explanation concerning the above elements will be omitted.

Referring to FIGS. 1 and 6, the reflecting member 360 is received in a receiving container 100 such that a light generated from lamps 210 is reflected from the reflecting member 360. The reflecting member 360 includes a plurality of protruded portions 361. The protruded portions 361 are protruded upward. Each of the protruded portions 361 supports each of the lamps 210. Each of the protruded portions 361 has a quadrangular cross-section. The protruded portions 361 are alternately arranged in a horizontal direction of the lamps 210.

According to the backlight assembly 1000 having the reflecting member 360 in FIG. 6, the reflecting member 360 includes the protruded portions 361 to absorb an externally provided impact.

Figure 7:
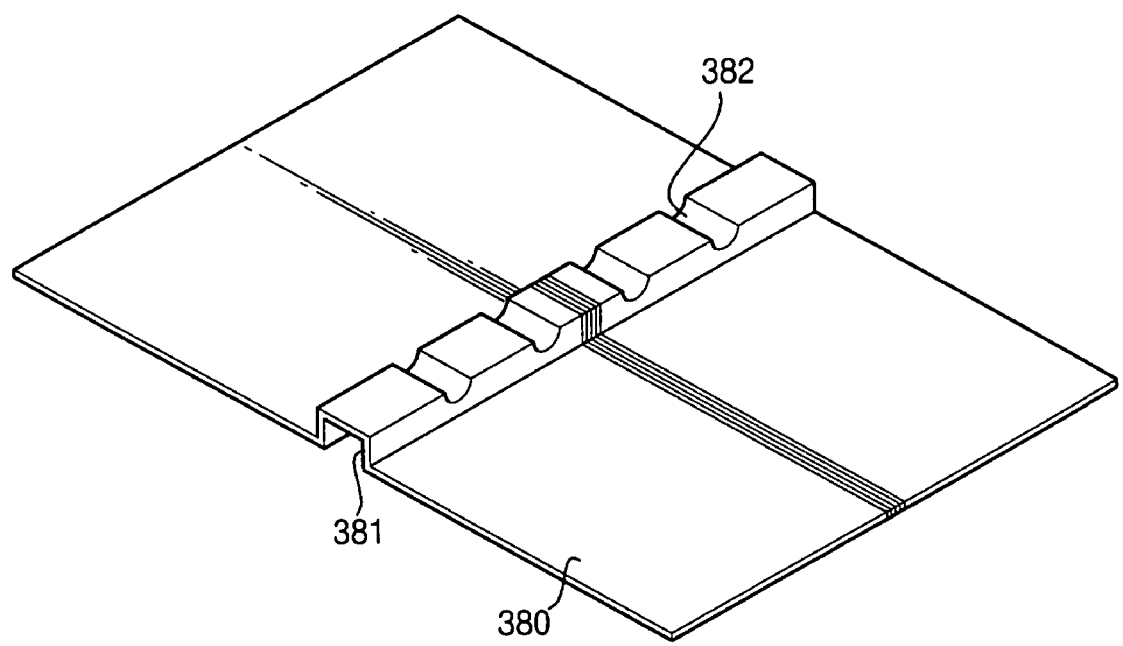
FIG. 7 is a perspective view showing another exemplary embodiment of a reflecting member in accordance with the present invention.

FIG. 7 is a perspective view showing another embodiment of a reflecting member in accordance with the invention. A backlight assembly 1000 having the reflecting member of FIG. 7 is substantially similar as in FIGS. 1 to 3 except for the reflecting member. Thus, the same reference numerals will be used to refer to the same or like parts as those described in FIGS. 1 to 3 and further detailed explanation concerning the above elements will be omitted.

Referring to FIGS. 1 and 7, the reflecting member 380 is received in a receiving container 100 such that a light generated from lamps 210 is reflected from the reflecting member 380 toward a viewer's side of the backlight assembly 1000. The reflecting member 380 includes a protruded portion 381 and a receiving portion 382. The protruded portion 381 is protruded upward from the reflecting member 380. In FIG. 7, the reflecting member 380 includes a plurality of receiving portions 382. The lamps 210 are received in the receiving portions 382, and make contact with the receiving portions 382, respectively. In FIG. 7, the lamps 210 are supported by the receiving portions 382, respectively, and each of the receiving portions 382 has a substantially similar cross-section as each of the lamps 210. In alternative embodiments, each of the receiving portions 382 may have a substantially similar cross-section as a portion of each of the lamps 210. The protruded portion 381 is extended in a direction that crosses a longitudinal direction of the lamps 210. In FIG. 7, the longitudinal direction of the protruded portion 381 is substantially in perpendicular to the longitudinal direction of the lamps 210. In FIG. 7, the receiving portion 382 has a semicircular cross-section, but any of a number of shapes and cross-sections are contemplated. In exemplary embodiments, the reflecting member 380 may also have a plurality of protruded portions 381 and receiving portions 382.

According to the backlight assembly 1000 having the reflecting member 380 in FIG. 7, each of the receiving portions 382 has the cross-section that is substantially similar to each of the lamps 210 to dissipate an externally provided impact. Advantageously, the receiving portions 382 protect the lamps 210 from the externally provided impact to improve a reliability of the backlight assembly 1000.

Figure 8:
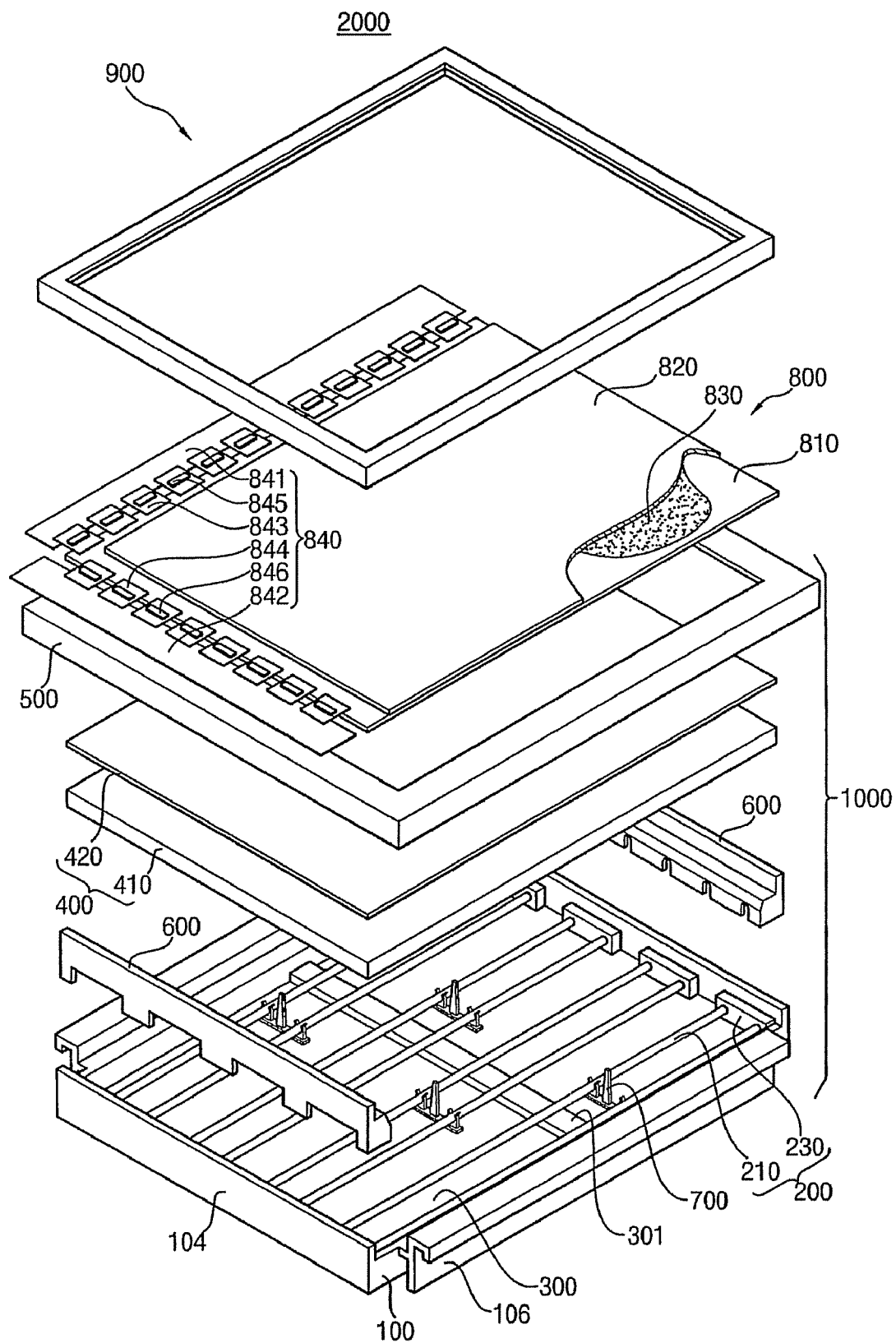
FIG. 8 is an exploded perspective view showing an exemplary embodiment of a display device in accordance with the invention.

FIG. 8 is an exploded perspective view showing an exemplary embodiment of a display device in accordance with the invention. A backlight assembly 1000 of FIG. 8 is same as in FIGS. 1 to 3. Thus, the same reference numerals will be used to refer to the same or like parts as those described in FIGS. 1 to 3 and further detailed explanation concerning the above elements will be omitted. In exemplary embodiments, the display device may be a liquid crystal display (LCD) device.

Referring to FIG. 8, the LCD device 2000 includes the backlight assembly 1000, an LCD panel 800 and a top chassis 900.

The LCD panel 800 displays images using a light generated from the backlight assembly 1000. The LCD panel 800 includes a thin film transistor (TFT) substrate 810, a color filter substrate 820 and a liquid crystal layer 830. The color filter substrate 820 substantially corresponds to the TFT substrate 810 as illustrated in FIG. 8. The liquid crystal layer 830 is interposed between the TFT substrate 810 and the color filter substrate 820.

In exemplary embodiments, the TFT substrate 810 may include a glass substrate and a plurality of TFTs (not shown) arranged in a matrix shape. Each of the TFTs may be a switching element. A source electrode (not shown) of each of the TFTs is electrically connected to one of data lines (not shown). A gate electrode (not shown) of each of the TFTs is electrically connected to one of gate lines (not shown). A drain electrode of each of the TFTs is electrically connected to a pixel electrode (not shown) that includes a transparent conductive material.

In another exemplary embodiment, the color filter substrate 820 may include a color filter (not shown) and a common electrode (not shown). The color filter may have a red (R) color filter portion, a green (G) color filter portion and a blue (B) color filter portion. The common electrode may be formed on the color filter (not shown).

Each of liquid crystals in the liquid crystal layer 830 has an intermediate phase between a liquid and a solid. Centers of gravity of the liquid crystals are different from one another. The liquid crystals are arranged in a predetermined direction. The liquid crystal layer 830 is interposed between the TFT substrate 810 and the color filter substrate 820. An electric field is formed between the pixel electrode (not shown) and the common electrode (not shown) based on externally provided driving signals. An arrangement of the liquid crystals layer 830 varies in response to the electric field applied thereto to change a light transmittance of the liquid crystal layer 830, thereby displaying an image.

Referring to FIG. 8, the LCD device 2000 further includes a driving part 840 that applies the driving signals to the LCD panel 800. The driving part 840 includes a data printed circuit board (PCB) 841, a gate PCB 842, a data flexible circuit film 843 and a gate flexible circuit film 844. The data and gate PCBs 841 and 842 apply the driving signals to the LCD panel 800 through the data and gate flexible circuit films 843 and 844, respectively. The data flexible circuit film 843 includes a data driving chip 845 to control a timing of the driving signals that are applied to the LCD panel 800 through the data flexible circuit film 843. The gate flexible circuit film 844 includes a gate driving chip 846 to control a timing of the driving signals that are applied to the LCD panel 800 through the gate flexible circuit film 844. Therefore, the arrangement of the liquid crystals of the liquid crystal layer 830 is controlled based on the driving signals from the driving circuit member 840 to display the image.

The top chassis 900 is on the LCD panel 800 to fix the LCD panel 800 to the backlight assembly 1000. The top chassis 900 surrounds sides of the LCD panel 800 to fix the LCD panel 800 to the receiving container 100. The top chassis 900 is combined with the receiving container 100. The top chassis 900 protects the LCD panel 800 from an externally provided impact, and essentially prevents a drifting of the LCD panel 800. In an alternative embodiment, the backlight assembly 1000 and the LCD panel 800 may be received in a receiving member (not shown) that has a bottom portion and a plurality of side portions that are protruded from sides of the bottom portion. In the LCD device 2000 in FIG. 8, the reflecting member 300, the lamps 210, the optical member 400 and the LCD panel 800 may also be sequentially received in a receiving space of the receiving container 100.

Figure 9:
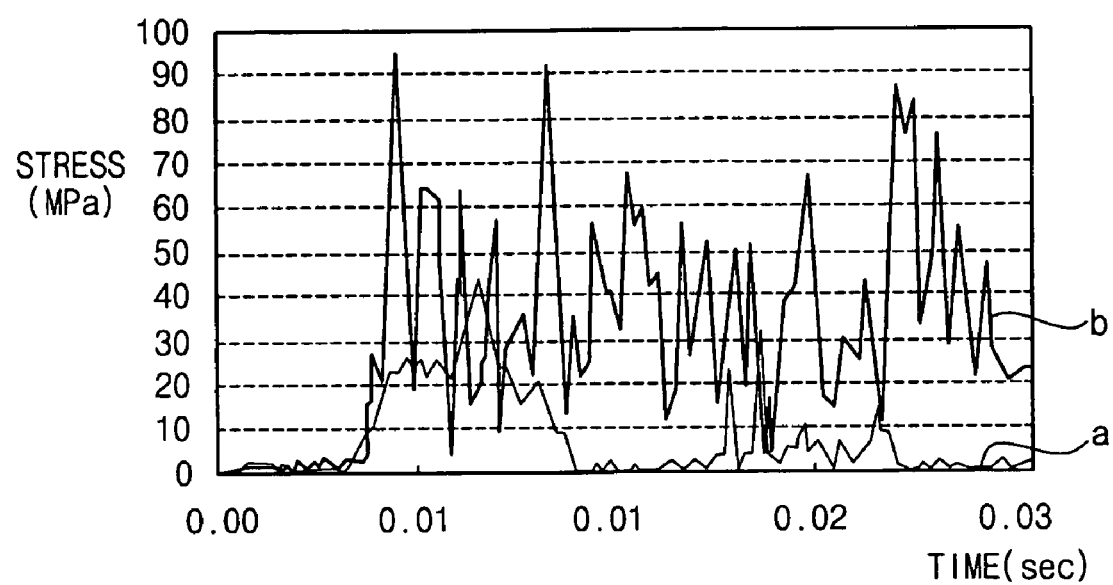
FIG. 9 is a graph showing an impact simulation of an exemplary embodiment a backlight assembly of the invention.

FIG. 9 is a graph showing an impact simulation of an exemplary embodiment of a backlight assembly according to the invention. The horizontal axis represents the time after the backlight assembly 1000 is impacted, and the vertical axis represents the stress applied to the backlight assembly 1000. Reference numerals 'a' and 'b' represent the backlight assembly shown in FIGS. 1 to 3 and a conventional backlight assembly without the protruded portion, respectively.

Referring to FIG. 9, the backlight assembly 'a' according to the illustrated exemplary embodiments is more stabilized than the conventional backlight assembly 'b'. When the conventional backlight assembly 'b' is impacted, lamps of the conventional backlight assembly 'b' may be broken. However, when the backlight assembly 'a' is impacted, the protruded portion according to the illustrated embodiments support the lamps to absorb the externally provided impact, thereby protecting the lamps.

According to an illustrated exemplary embodiment of the invention, the protruded portion of the reflecting member supports the optical member to absorb the externally provided impact. Advantageously, a deformation of the lamps and a separation of the lamps from the receiving container is essentially prevented, or effectively reduced.

In another exemplary embodiment, an additional lamp fixing member may be omitted such that a manufacturing cost is decreased, and a manufacturing process is simplified.

This invention has been described with reference to the exemplary embodiments. It is evident, however, that many alternative modifications and variations will be apparent to those having skill in the art in light of the foregoing description. Accordingly, the an illustrated embodiment of the invention embraces all such alternative modifications and variations as fall within the spirit and scope of the appended claims.

What is claimed is:

1. A backlight assembly comprising:
    a receiving container including a bottom plate and a sidewall protruded from a side of the bottom plate;
    a light source received in the receiving container, the light source generating a light;
    a reflecting member interposed between the bottom plate and the light source, the reflecting member including a protruded portion protruded upward to support the light source, the protruded portion being continuous with the reflecting member; and
    an optical member on the light source;
    wherein an upper surface of the protruded portion of the reflecting member contacts a lower surface of a light emitting section of the light source; and
    wherein an empty recessed space is formed between the protruded portion and the bottom plate of the receiving container, and in a direction substantially perpendicular to the bottom plate.

2. The backlight assembly of claim 1, further comprising a light source fixing member including a supporting portion and a holding portion, the supporting portion being on the bottom plate and configured to support the optical member and the holding portion configured for holding the light source.

3. The backlight assembly of claim 1, further comprising a guide member configured to support a peripheral portion of the optical member and guide the optical member.

4. The backlight assembly of claim 1, further comprising a mold frame combined with the receiving container to fix the optical member to the receiving container.

5. The backlight assembly of claim 1, wherein the optical member comprises:
    a diffusion plate that diffuses the light generated from the light source; and
    a brightness enhancement film that increases a luminance of the light that has passed through the diffusion plate when viewed from a front of the backlight assembly.

6. The backlight assembly of claim 1, wherein the protruded portion crosses a longitudinal direction of the light source.

7. The backlight assembly of claim 1, wherein the protruded portion comprises a quadrangular cross-section, a semicircular cross-section, a triangular cross-section, a trapezoidal cross-section or any combination including at least one of the foregoing.

8. The backlight assembly of claim 1, wherein the reflecting member comprises a plurality of protruded portions, the protruded portions being alternately arranged in a horizontal direction of the light source.

9. The backlight assembly of claim 1, wherein the protruded portion comprises a receiving portion disposed on the upper surface of the protruded portion and receiving the light source.

10. The backlight assembly of claim 9, wherein the receiving portion comprises a substantially same cross-section as the light source.

11. The backlight assembly of claim 1, wherein the reflecting member further includes a plurality of planar portions disposed substantially parallel to the bottom plate of the receiving container, the protruding portion connecting adjacent planar portions.

12. A display device comprising:
a backlight assembly including:
a receiving container comprising a bottom plate and a sidewall protruded from a side of the bottom plate;
a light source received in the receiving container, the light source generating a light;
a reflecting member extended substantially a whole of a longitudinal length of the light source and interposed between the bottom plate and the light source, the reflecting member including a protruded portion protruded upward to support the light source, the protruded portion being continuous with the reflecting member; and
an optical member on the light source;
and wherein an empty recessed space is formed between the protruded portion and the bottom plate of the receiving container, and in a direction substantially perpendicular to the bottom plate;
wherein an upper surface of the protruded portion of the reflecting member contacts a lower surface of a light emitting section of the light source;
a display panel on the backlight assembly to display an image using the light from the backlight assembly; and
a fixing member that fixes the display panel to the backlight assembly.

13. The display device of claim 12, wherein the backlight assembly further comprises a light source fixing member including a supporting portion and a holding portion, the supporting portion being on the bottom plate and configured to support the optical member and the holding portion configured for holding the light source.

14. The display device of claim 12, wherein the backlight assembly further comprises a guide member configured to support a peripheral portion of the optical member and guide the optical member.

15. The display device of claim 14, wherein the backlight assembly further comprises a bending portion configured to support a peripheral portion of the optical member and guide the optical member, the bending portion being substantially perpendicular to the guide member.

16. The display device of claim 14, wherein the guide member comprises a recess configured to receive an end portion of the light source, the guide member being substantially perpendicular to a longitudinal direction of the light source.

17. The display device of claim 12, further comprising a mold frame combined with the receiving container to fix the optical member to the receiving container.

18. The display device of claim 12, wherein the protruded portion is substantially perpendicular to a longitudinal direction of the light source.

19. The display device of claim 12, wherein the reflecting member comprises a micro-cellular high-reflection foamed sheet.

20. The display device of claim 12, wherein the display panel comprises is a liquid crystal display panel including a liquid crystal layer and two substrates, the liquid crystal layer interposed between the two substrates.

21. A display device comprising:
a backlight assembly including:
a lamp received in the receiving container;
a reflecting member received in a receiving container, the reflecting member including a protruded portion protruded upward and configured to support the lamp, the protruded portion being continuous with the reflecting member; and
an optical member on the lamp;
wherein an upper surface of a distal end of the protruded portion of the reflecting member contacts a lower surface of the light source of a light emitting section;
and wherein an empty recessed space is formed between the protruded portion and a bottom plate of the receiving container, and in a direction substantially perpendicular to the bottom plate;
a display panel on the backlight assembly configured to display images; and
a receiving member configured to receive the backlight assembly and the display panel.

22. The display device of claim 21, wherein the receiving container comprises a bending portion configured to support a peripheral portion of the optical member and guide the optical member.

23. The display device of claim 21, wherein the lamp comprises a cold cathode fluorescent lamp or an external electrode fluorescent lamp.

24. The display device of claim 21, wherein the backlight assembly further comprises a lamp holder configured to fix the lamp to the receiving container, the lamp holder disposed at an end of the lamp and combined with the receiving container.

25. The display device of claim 21, wherein the display panel is a liquid crystal display panel comprising a liquid crystal layer interposed between two substrates.

26. The display device of claim 25, further comprising a driving member configured to apply driving signals to the display panel and control an arrangement of the liquid crystal layer, wherein the driving member comprises a data printed circuit board, a gate printed circuit board, a data flexible circuit film and a gate flexible circuit film.

* * * * *